(12) United States Patent
Wigren

(10) Patent No.: US 9,414,291 B2
(45) Date of Patent: Aug. 9, 2016

(54) DYNAMIC TAG CONTROL AND FINGERPRINTING EVENT LOCALIZATION

(75) Inventor: Karl Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 228 days.

(21) Appl. No.: 13/265,865

(22) PCT Filed: Apr. 27, 2009

(86) PCT No.: PCT/SE2009/050436
§ 371 (c)(1),
(2), (4) Date: Oct. 22, 2011

(87) PCT Pub. No.: WO2010/126407
PCT Pub. Date: Nov. 4, 2010

(65) Prior Publication Data
US 2012/0040637 A1    Feb. 16, 2012

(51) Int. Cl.
*H04M 11/04* (2006.01)
*H04W 36/38* (2009.01)

(52) U.S. Cl.
CPC .................................. *H04W 36/385* (2013.01)

(58) Field of Classification Search
CPC ............ H04W 64/003; H04W 64/006; H04W 36/385
USPC ........... 342/357.42, 357.43; 455/404.1, 404.2
See application file for complete search history.

(56) References Cited

U.S. PATENT DOCUMENTS

| | | | | |
|---|---|---|---|---|
| 6,847,892 | B2 * | 1/2005 | Zhou et al. ................... | 701/408 |
| 2002/0160745 | A1 * | 10/2002 | Wang ............................ | 455/404 |
| 2006/0287831 | A1 * | 12/2006 | Totiba et al. .................... | 702/19 |
| 2007/0013519 | A1 * | 1/2007 | Chung et al. ................... | 340/572.1 |
| 2007/0032244 | A1 * | 2/2007 | Counts et al. ................ | 455/456.1 |
| 2009/0017831 | A1 | 1/2009 | Wigren | |

FOREIGN PATENT DOCUMENTS

| | | |
|---|---|---|
| WO | 2007/089182 A1 | 8/2007 |
| WO | WO 2007086784 A1 * | 8/2007 |

OTHER PUBLICATIONS

T. Wigren, Adaptive Enhanced Cell-ID Fingerprinting Localization by Clustering of Precise Position Measurements, Trans. Vehicular Technology, vol. 56, No. 5, pp. 3199-3209, IEEE, Sep. 2007.
European Patent Office, Intl Search Report in PCT/SE2009/050436, Feb. 15, 2010.
European Patent Office, Written Opinion in PCT/SE2009/050436, Feb. 15, 2010.
European Patent Office, Intl Preliminary Report on Patentability in PCT/SE2009/050436, Jul. 4, 2011.

* cited by examiner

*Primary Examiner* — Joshua Schwartz
(74) *Attorney, Agent, or Firm* — Patent Portfolio Builders PLLC

(57) ABSTRACT

In a method for clustering position determination for providing position determination assisting data in a cellular communications network, detecting S1 an event, such as the occurrence of an emergency call or sudden drop in radio quality, providing a tag S2 for the detected event comprising event specific information. Subsequently, providing S3 high precision position measurements the said tagged detected event, and repeating S4 said detecting and providing steps a plurality of times. Finally, obtaining local clusters S5 of high-precision position measurements based on the event specific tag.

10 Claims, 5 Drawing Sheets

DYNAMIC TAG CONTROL AND FINGERPRINTING EVENT LOCALIZATION

TECHNICAL FIELD

The present invention relates to methods and systems for position determination of mobile terminals in a cellular communications network, and in particular to localizing events in such systems.

BACKGROUND

All cellular communications systems are divided into cells, where User Equipments (UE) served by one, or when in soft(er) handover several base stations. Each base station may serve UEs in more than one cell. The important point from a positioning and navigation perspective is that the cell where a specific UE is located is known in the cellular system. Hence, after determination of the geographical area covered by a specific cell, it can be stated that the UE is located somewhere within said geographical area, as long as it is connected and the reported cell identity of the serving cell is equal to the cell identity corresponding to the particular geographical area.

An example of positioning within a Wideband Code Division Multiple Access (WCDMA) cellular system operates briefly as follows, assuming that the positioning operates over the Radio Access Network Application Part (RANAP) interface. The procedures are however similar for e.g. the Global System for Mobile communications (GSM) and Code Division Multiple Access 2000 (CDMA 2000).

A message requesting a location estimate is received in the Serving Radio Network Controller (SRNC) over the RANAP interface. The quality of service parameters of the message is assumed to be such that the Radio Network Controller (RNC) selects the cell identity positioning method. The SRNC determines the serving cell identity of the UE to be positioned and retrieves a pre-stored polygon that represents the extension of the serving cell. The SRNC sends the resulting cell polygon back to the core network over the RANAP interface, using a cell polygon format in a location report message.

It should, however, be noted that due to the complexity of the radio propagation, the cell polygon format is only an approximation of the extension of the true cell. The selection of the polygon format is dictated by the need to have a reasonably flexible geographical representation format, taking e.g. computation complexities and reporting bandwidths into account.

Since the polygon format approximates the cell extension, the polygon is normally pre-determined in a cell-planning tool to represent the cell extension with a certain confidence. The confidence is intended to represent the probability that the UE is located within the polygon, conditioned on the fact that it is connected to the cell that is represented by the cell polygon. The underlying off-line calculation of the cell polygon can e.g. be based on coverage simulations of varying levels of sophistication. However, the end result is normally not very reliable when the confidence of the calculated cell extension is considered.

The accuracy of the cell identity positioning method is mainly limited by the size of the cell, something that prevents it from being used in more sophisticated navigation applications. Its main advantages include a very low response time as well as the fact that it is widely spread and always available where there is cellular coverage. The cell identity method is also straightforward to implement and has no UE impact. The advantages has lead to an interest for the development of Enhanced cell identity (E-cell ID) positioning methods that aim at enhancing the accuracy of the basic cell identity method at the same time as the advantages of the method are retained.

One principle for E-cell ID positioning aims at combining the cell extension model with a distance measure. Two possibilities towards this end are Round Trip Time (RTT) measurements and path loss measurements. The most accurate of these two alternatives is the RTT measurement. The path loss measurement suffers from shadow fading effects, which result in accuracies that are of the order of half the distance to the UE. In the RTT measurement principle, the travel time of radio waves from the Radio Base Station (RBS) to the UE and back is measured. The RTT method alone defines a circle around the RBS. By combining this information with the cell polygon, left and right angles of the circle can be computed.

Another idea for enhanced cell identity positioning has been to use pre-calculated maps of the regions where the UE is in soft(er) handover with one or several cells. Such areas are significantly smaller than the whole cell opening up for a better accuracy of the determined position. Normally these maps are pre-calculated in the planning tool, exactly as the ordinary cell polygons.

In the present disclosure, the term high precision positioning is used to denote positioning methods that have a potential to meet the North-American E-911 emergency positioning requirements. Methods that meet these requirements are capable of obtaining positioning accuracies of either (terminal based) 50 meters (67%) and 150 m (95%),
or (network based) 100 meters (67%) and 300 m (95%).

One well-known positioning method is the so-called Assisted GPS (A-GPS) positioning. A-GPS is an enhancement of the global positioning system (GPS). An example of an A-GPS positioning method is displayed in FIG. 1, in this case a WCDMA system. In this system, the radio network controller (RNC) acts as the node that collects, refines and distributes assistance data to the terminals (denoted user equipment (UE) in WCDMA). The core network (CN) requests positioning of a UE over the RANAP interface. In response, the RNC may use various kinds of A-GPS techniques, all these techniques do however build on assistance data being handled by a node in the cellular communication system. The RNC orders positioning measurements to be performed in the UE, measurements that are performed by dedicated A-GPS receiver hardware in the terminals. These receivers detect GPS transmissions from the satellites that are also denoted space vehicles (SVs).

Accordingly, the GPS reference receivers attached to e.g. a cellular communication system collect assistance data that, when transmitted to GPS receivers in terminals connected to the cellular communication system, enhance the performance [8] of the GPS terminal receivers. Typically, A-GPS accuracy can become as good as 10 meters also without differential operation. The accuracy becomes worse in dense urban areas and indoors, where the sensitivity is often not high enough for detection of the very weak signals from the GPS satellites.

Additional assistance data is collected from the cellular communication system directly, typically to obtain a rough initial estimate of the position of the terminal together with a corresponding uncertainty of the initial estimate. This position is often given by a cell identity (cell-ID) positioning step, i.e. the position of the terminal is determined with cell granularity. Alternatively, a more accurate position can be obtained by round trip time (RTT) positioning and/or soft(er) handover maps. The GPS time is also estimated with as good accuracy as the cellular system allows.

The above-mentioned positioning methods, are not responsive to events occurring in the cellular system e.g. poor radio quality effects or emergency positioning requests. Therefore, there is a need for solutions that provide that functionality, and other.

SUMMARY

The present invention relates to an improved positioning method.

An aim of the present invention is to provide a positioning method, which is responsive to events occurring in the system.

A method for clustering position determination for providing position determination assisting data in a cellular communications network, includes the steps of detecting S1 an event, e.g. drop in radio quality or emergency positioning request. Thereafter providing a tag S2 for the detected event, said tag comprising event specific information, and providing (S3) high precision position measurements S3 for the detected event. Subsequently, repeating S4 the detecting and providing steps a plurality of times, and obtaining local clusters S5 of high-precision position measurements based on said event specific tag.

In addition, the present invention discloses an arrangement 1 for position determination in a cellular communications network. The arrangement comprises an event detector 10 for detecting an event, a tagging unit 20 for providing a tag for the detected event, said tag comprising event specific information. In addition, the arrangement comprises a measurement unit for providing 30 high precision position measurements for said detected event. Finally, a clustering unit 40 for obtaining local clusters of high-precision position measurements based on said event tag.

Advantages of the present invention include:
Enabling event based local clusters of high precision reference measurements;

BRIEF DESCRIPTION OF THE DRAWINGS

The invention, together with further objects and advantages thereof, may best be understood by referring to the following description taken together with the accompanying drawings, in which.

ABBREVIATIONS

AECID Adaptive Enhanced Cell IDentity
A-GPS Assisted GPS
GSM Global System for Mobile Communication
LTE Long Term Evolution
RANAP Radio Access Network Application Part
RBS Radio Base Station
RNC Radio Network Controller
RTT Round Trip Time
SRNC Serving RNC
TA Timing Advance
UE User Equipment
WCDMA Wideband Code Division Multiple Access

DETAILED DESCRIPTION

Figure 1:
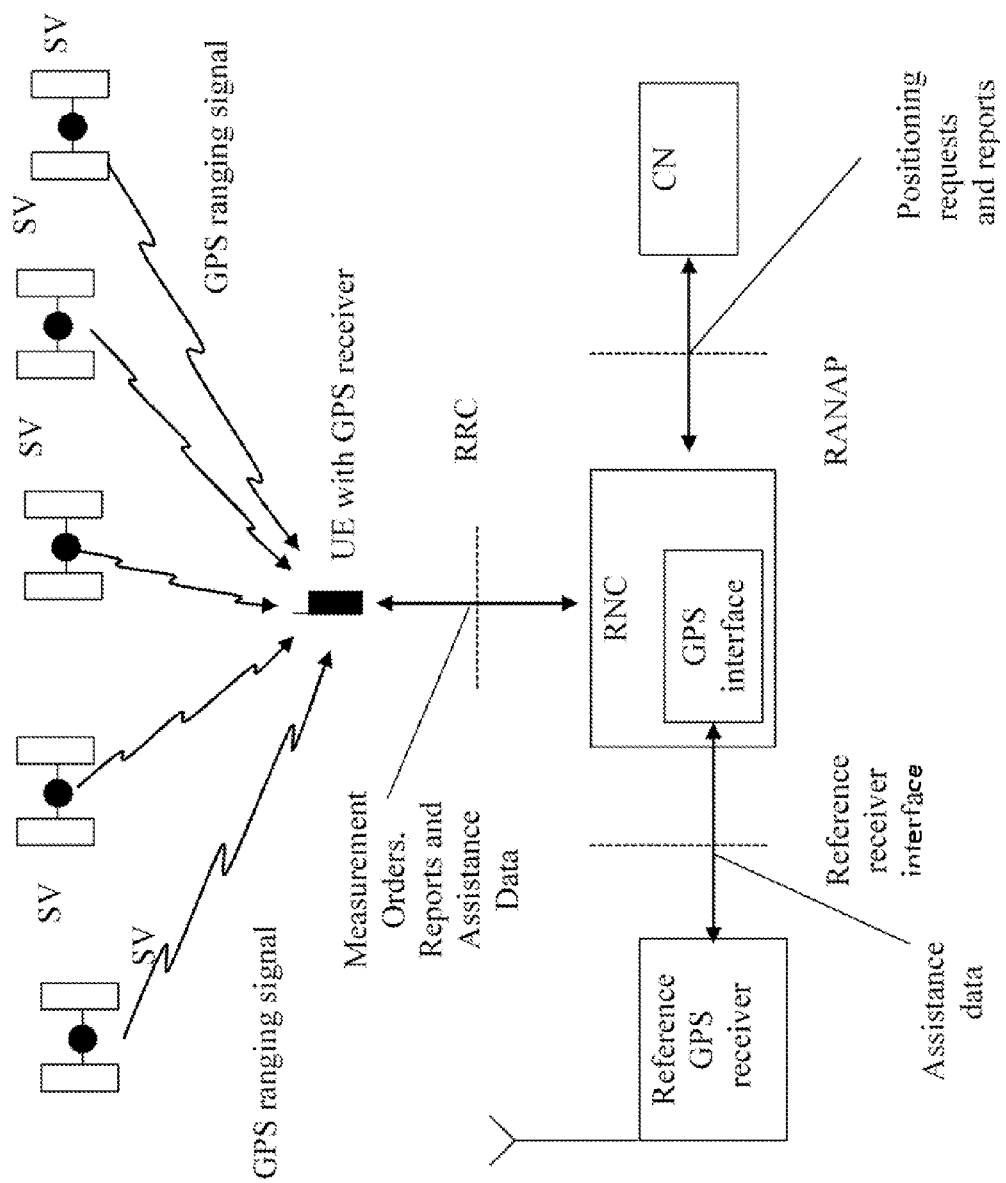
FIG. 1 is an example of a known A-GPS system.
Figure 2:
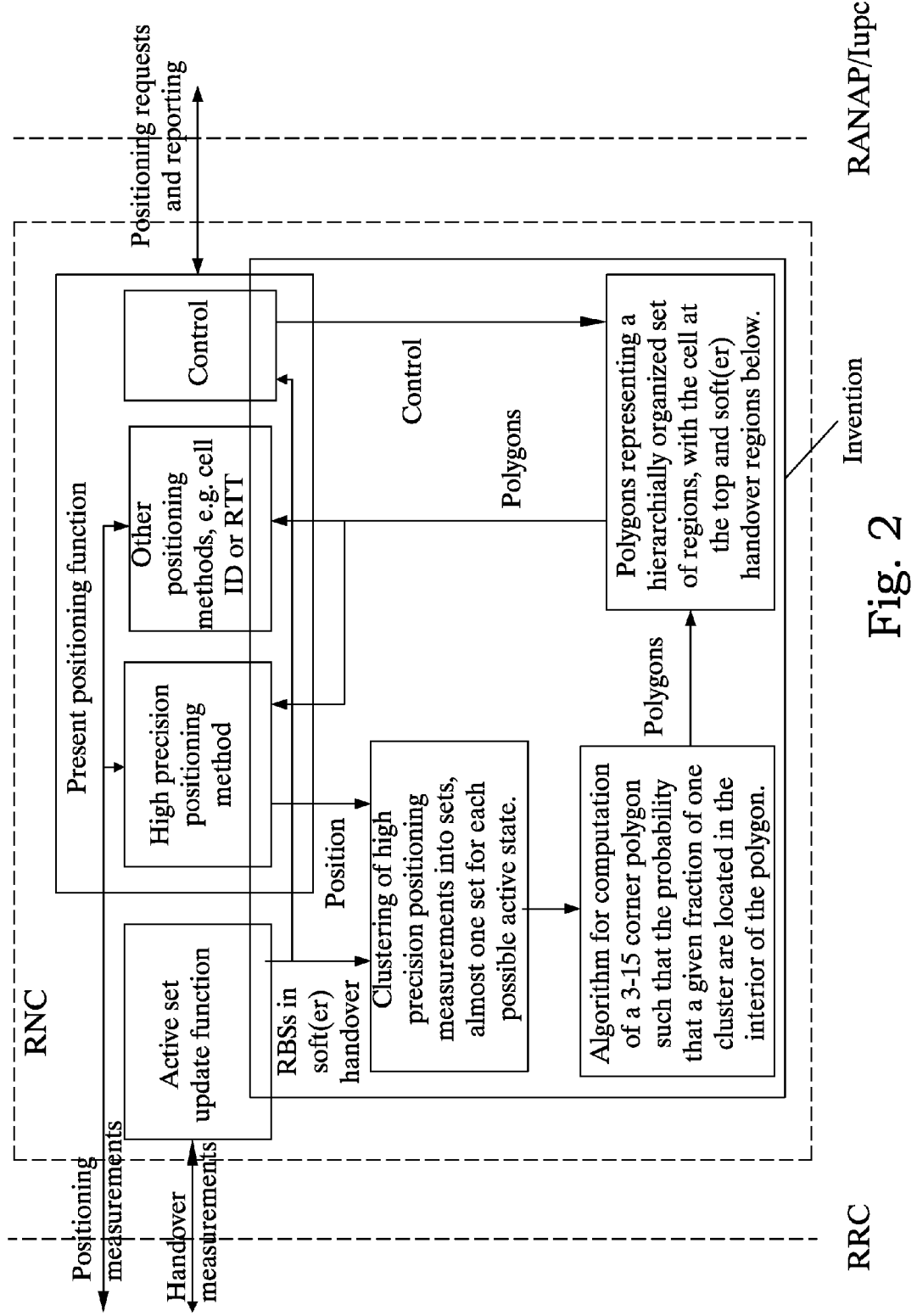
FIG. 2 is an example of a positioning method in which the present invention can be implemented.

A recent development that exploits A-GPS is so-called Adaptive Enhanced Cell Identity (AECID) positioning [1]-[6]. A block diagram of an example of a basic implementation of the AECID positioning method is illustrated in FIG. 2.

The AECID positioning algorithm is based on a polygon format of and an algorithm for computation of a polygon [1]-[6] from a cluster of tagged high-precision position measurements. In WCDMA the high precision measurements are e.g. being provided by A-GPS positioning steps. The main steps of the AECID algorithm are according to the schematic flow below (for WCDMA in particular steps 1 a-1 c, and steps 5ai-5aiii are important)

1. Tagging of high precision position measurements (e.g. A-GPS measurements) with at least one of
   a. Cell Ids of detected cells.
   b. Auxiliary connection information (e.g. RAB, time)
   c. Quantized auxiliary measurements (e.g. pathloss, signal strength, RTT, pre-coding indices (in MIMO these carry angular information) or noise rise)
2. Collection of all high precision measurements with the same tag in high precision measurement clusters.
3. Calculation of a (tagged) polygon that contains a pre-specified fraction of said clustered high precision position measurements in the interior, thereby providing a polygon with known confidence [1]-[6] value. Note: The confidence is the probability that the UE is actually located in the reported region.
4. Storage of said tagged polygons in a database of polygons.
5. When an AECID positioning is to be performed, the following steps are performed:
   a. Determination of at least one of
      i. Cell Ids of detected cells.
      ii. Auxiliary connection information
      iii. Quantized auxiliary measurements
   b. Formation of the tag, defined by step a.
   c. Retrieval of the polygon, corresponding to said tag.
   d. Reporting of said polygon, over RANAP or PCAP.

The present disclosure relates to positioning in telecommunications systems, especially in WCDMA (LTE) and/or GSM. The previously described positioning method has a few specific problems with relation to the step of collecting all high precision measurements with the same tag in high precision measurement clusters. Firstly, the clustering step is not responsive to events occurring in the cellular system. Such events could be the occurrence of poor radio quality effects, or emergency positioning requests. Secondly, the clustering step is geographically static, i.e. it is unable to handle geographical regions the move or vary quickly with time. It is therefore an aim of the present invention to provide an improved positioning method, which negates the two above mentioned problems.

In order to be able to thoroughly describe the benefits of the present invention, clustering according to prior art [1]-[6] will be described.

The focus of the present invention is on improvements of the state of the art algorithm for clustering in AECID. The version described here exploits only the cell IDs of the active set in a WCDMA system for tagging. Extensions are described in [1]-[6]. The clustering algorithm typically operates as follows:

High precision measurements are normally obtained expressed in the WGS 84 geographical reference system. The measurements that are available at time t are denoted according to Equation 1 below:

$$(lat_j(t_j) long_j(t_j))^T, j=1,\ldots,N(t), \quad (1)$$

where $lat_j(t_j)$ and $long_j(t_j)$ denote the measured latitude and longitude, respectively, at the time $t_j$. $N(t)$ denotes the total number of available measurements at time t.

At the same time $t_j$ (within some reasonable accuracy in time), the active set is sampled for cell identities. The result is the row vector (or pointer) of Equation 2 below:

$$ActiveSet(t_j) = (cID_1(t_j) cID_2(t_j) \ldots cID_{N(t_j)}(t_j)) \quad (2)$$

where $cID_1(t_j)$ is the cell identity of the l:th strongest cell in softer handover, for the UE for which high precision positioning was performed at time $t_j$. $N(t_j)$ is the number of cells in the active set at time $t_j$.

An arbitrary possible tag used for clustering of measurements, defined according to (2), is now denoted by Equation 3:

$$Tag_k = (Index_1(k) \ldots Index_{N(k)}(k)), k=1,\ldots,K \quad (3)$$

where $Index_1(k)$ is the l:th component of the (fix) tag k, $N(k)$ is the dimension of the pointer k and K is the number of pointers. The corresponding list of high precision position measurements is denoted by $List_k$. At time t the measurements are denoted according to Equation 4 below:

$$List_k(t) = \begin{pmatrix} lat_{k,1}(t_{k,1}) & lat_{k,2}(t_{k,2}) & \ldots & lat_{k,M(k,t)}(t_{k,M(k,t)}) \\ long_{k,1}(t_{k,1}) & long_{k,2}(t_{k,2}) & \ldots & long_{k,M(k,t)}(t_{k,M(k,t)}) \\ t_{k,1} & t_{k,2} & \ldots & t_{k,M(k,t)} \end{pmatrix}, \quad (4)$$

where $M(k,t)$ denotes the number of high precision measurements of list k at time t. When a new high precision measurement and corresponding active set is obtained at time $t_{N(t)+1}$, the clustering algorithm operates as follows

```
For k = 1 to K
    If Tag_k = ActiveSet(t_{N(k)+1})
        List_k(t_{N(k)+1}) = ( List_k(t) ( lat_{N(t)+1}(t_{N(t)+1})
                                           long_{N(t)+1}(t_{N(t)+1})
                                           t_{N(t)+1}           ))
    end
    else
        do nothing
    end
end
```

The algorithm hence generates one cluster of measurement, for each value.

In addition to the already mention problems with the above mentioned clustering algorithm, also the following disadvantages with the prior art fingerprinting/positioning method are present. The previously disclosed functionality of the abovementioned fingerprinting algorithm [1]-[6] is not capable of dynamical initiation, maintenance, and discontinuation of clusters of high precision measurements, in response to certain events. Further, the previously disclosed functionality does not include post-processing of emergency positioning in emergency center software.

The present invention aims to solve those problems by providing a dynamic event based tag control of the fingerprinting event localization.

Specifically, the present invention discloses new and improved methods for localization of events in cellular systems, using previously disclosed technology for fingerprinting cellular positioning [1]-[6]. The method is applicable for both GSM and WCDMA.

This invention relates primarily to the clustering step of the above-mentioned fingerprinting positioning algorithm [1]-[6].

Figure 3:
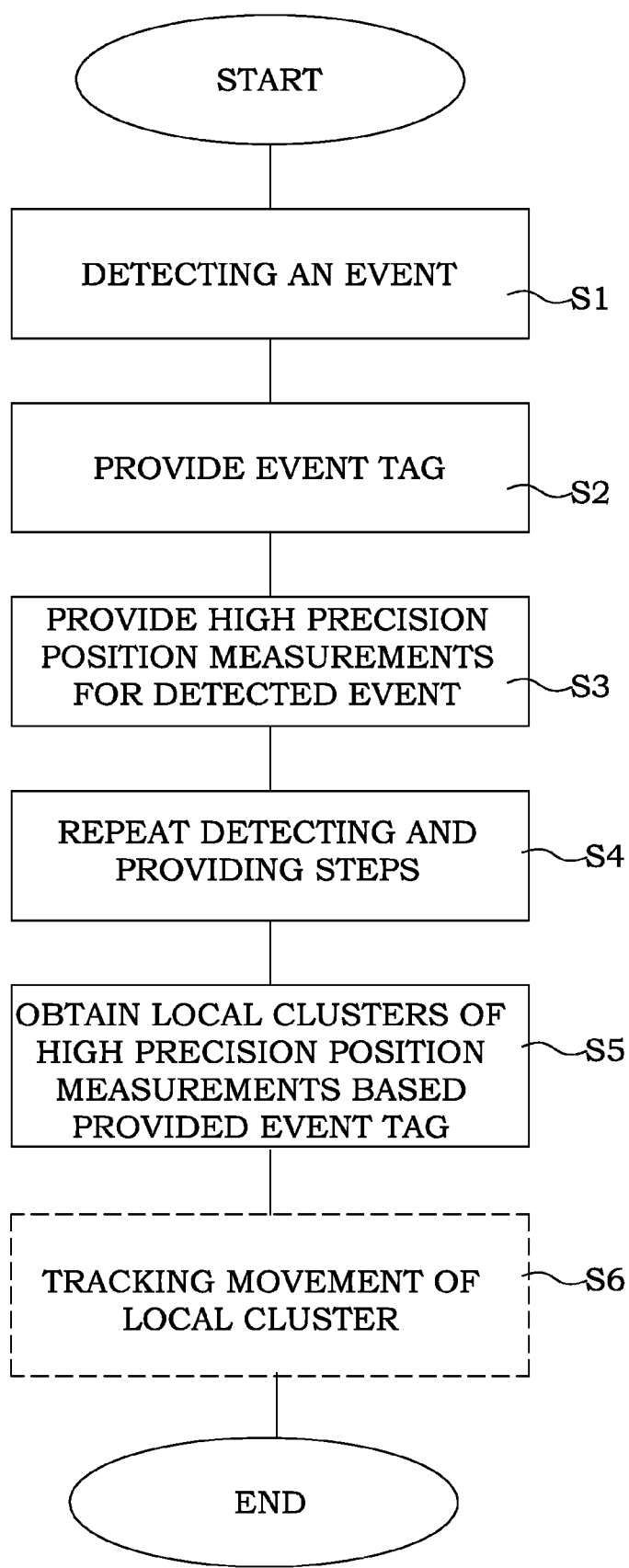
FIG. 3 illustrates an embodiment of a method according to the present invention.

With reference to FIG. 3, a general embodiment of an improved clustering positioning determination method according to the present invention will be described. The method will be mainly described in the context of a WCDMA (LTE) system, but is equally applicable for a GSM system or similar.

Initially an event is detected S1 in the system, the event can comprise a predetermined indication such as an incoming call classified as an emergency call according to a set criteria, or a detected drop in radio link quality or corresponding parameter. Subsequently an event specific tag is provided S2 based on the detected event. This event specific tag can be used to completely replace an already present tag, or can be used to adapt or update an already available tag with additional event specific information. High precision position measurements are subsequently provided S3 for the detected and tagged event. For the case of E-911 calls, the measurements are automatically provided, for other scenarios the step of providing the measurements can comprise performing the actual measurements, initiating measurements or receiving measurements collected by a node in the system. The steps of detecting events, tagging detected events and providing high precision position measurements are repeated S4 a plurality of times to obtain local clusters S5 based on the event specific tag.

One main aspect of the method described above is that it enables replacing or augmenting the tagging of high precision measurements/positioning (e.g. latitude/longitude points) used in order to establish localized clusters of high precision measurements, with information related to specific events. The replacement/augmentation enables important applications, in particular for emergency positioning. In [1] the clusters are e.g. organized by cell IDs, i.e. the fingerprinting algorithm builds cell polygons at the highest level, said cell polygons being geographically static.

It is off course not viable to continuously have the above described local clustering process enabled. It would therefore be beneficial to enable an initiation procedure for the local clustering method of the present invention. This could be enabled by an embodiment of a detection algorithm for initiation of the event based clustering process, local in time and geographical location, according to the following:

Providing means and methods for storing and determining when a sufficient number of events (e.g. emergency calls) have occurred closely enough in time and space, to trigger the initiation of the local clustering process (of high precision measurements).

Providing means and methods for determining when a new event (e.g. emergency call) originates closely enough in time and distance, to be associated with the event (emergency) cluster of high precision measurements, If so, including said new high precision measurement in said event (emergency) cluster.

In addition, the present invention enables an organization of clusters after geographically and temporally local collections of emergency calls (disregarding cell information for the moment). Such collections of emergency calls, occurring closely in time, are likely to occur in disaster situations, e.g. caused by wild fires, unintentional release of poisonous emissions in the atmosphere, nuclear accidents or large terrorist activity. It should be noted that the location of the collections of emergency calls are likely to move, e.g. due to the wind. It would therefore be beneficial to provide a clustering method, which enables tracking S6 the movement of a local event-based cluster according to the present invention.

Accordingly, and with reference to FIG. 4, an embodiment of a method for tracking S6 the movement of an event based local cluster will be described. Basically, the geographical position of a local event based cluster of high precision position measurements is determined at a specific moment in time. The geographical position can be determined by means of calculating a centre of gravity of the local event based cluster by some known method, updating the local cluster by removing high precision measurements when the age of the measurement reaches a predetermined threshold, and recalculating the geographical position of the updated cluster. Consequently, the movement of the event cluster can be determined and monitored. This provides a powerful tool for managing e.g. fire fighting or other disaster areas. In short, the present invention provides maintenance algorithms for local event (emergency) clusters, thus enabling movement of the cluster by removal of high precision points, depending on their age or location. Note that this removal is many orders of magnitude faster than in the maintenance of the static clusters of the previously disclosures [1]-[6].

In case of monitoring of cellular radio connections in certain areas, the maintaining algorithms would be omitted. Further, tagging would be augmented with a radio quality measure. Still further, the original structure of tags of [1], using cells at the top, would probably be retained, i.e. this would be a case where tagging are augmented, not replaced.

Further, the present invention discloses methods and arrangements for dynamic tag control, wherein all new functionality for tagging and clustering would re-use the disclosed techniques for computation of polygons, from the obtained clusters of high precision measurements. However, the emergency tagging and clustering solution can also reside in the emergency center (PSAP) itself—there is no need for it to be located in the positioning node of the cellular system.

Finally, the present invention provides fingerprinting positioning software for post-processing of emergency positioning, said software for post processing thus exploiting reported emergency positioning.

Below follows detailed examples and explanations of the embodiments of the present invention.

The starting point of the methods of the present invention is that the positioning node where the AECID algorithm is implemented monitors certain selected events. This can e.g. be the occurrence of emergency calls, dropped calls, or failed connections. At least two classes of events can be distinguished:

Firstly, situations where the event means that the connection is not lost, i.e. where further actions can be initiated for the ongoing connection. The classification of a call as an emergency call is an example.

Secondly, situations where the event means that the connection is lost, i.e. further actions must be initiated on other connections that are "close" geographically. The occurrence of a dropped call is an example.

The dynamic tag control functionality need to work differently in the two cases. In the first case, the dynamic tag control initiates the initiation of a cluster directly, using the triggering event, the associated position (if it exists, otherwise a positioning can be initiated), possibly in connection with other events or information sources. In the second case, the dynamic tag control needs to initiate the initiation of clusters using a tag that is different from the event itself. The initiation need to be performed in a larger region, e.g. a cell, since there is no position associated with the triggering event. The initiation scheme is also different since a number of connections need to be actively supervised.

It is finally noted that the initiation of the cluster initiation scheme is performed dynamically, in response to events in the cellular network. Previously disclosed algorithms are not capable of this—rather they are designed to operate continuously.

A few examples of implementation of initiation of the dynamic tag control with relation to a positioning system will be described.

A first case is described for the occurrence of emergency calls. The first step is to establish the event specific tag, see Equation 5, consisting only of emergency call information $$\text{Tag}_1 = (\text{isEmergencyCall}_1(t_1)) \tag{5}$$

Note that the Boolean isEmergencyCall is really superfluous, it is included for clarity only. Note further that no other information related to the cell is included. The reason is that the emergency region may extend over cell borders and that it may move. A tentative cluster is then initiated as Equation 6:

$$tentativeCluster = \begin{pmatrix} lat_1 \\ long_1 \\ t_1 \end{pmatrix} \tag{6}$$

It can be noted that in case of emergency calls, at least in North-America, a high precision (A-GPS) reference position is typically automatically generated. If A-GPS is not successful, a fall back method with lower accuracy may be automatically applied. If this is not the case, the position needs to be generated as well, by initiation of a new positioning. A search is then initiated, for emergency calls that originate close to the tentative cluster. To describe one possible algorithm the vector pointing to the first point of the cluster (in a selected Cartesian coordinate system) is denoted by $r_1$, additional points associated with emergency positions are denoted $r_i$. One possible initiation algorithm is then

```
sizeOfCluster = 1
While t_i - t_1, < t_threshold,1
    If (||r_i - r_1|| < d_threshold,1 & isEmergencyCall_i (t_i))
                                    ⎛ lat_i  ⎞
        tentativeCluster = ⎜ tentativeCluster long_i ⎟
                                    ⎝ t_i    ⎠
        sizeOfCluster = sizeOfCluster + 1
    End
end
if sizeOfCluster > sizeLimit
    localCluster = tentativeCluster
End
```

Here sizeOfCluster is the number of reference positions of the tentative Cluster, $t_i$ is the time tag of the i:th emergency call since the dynamic tag control first triggered the initiation of the cluster, $t_{threshold,1}$ is a threshold setting the maximum duration for the build up of the tentative cluster, $\|r_i - r_1\|$ is the distance between the position of the i:th emergency call and the first, $d_{threshold,1}$ is the threshold, defining how close positions need to be to qualify for being in the same cluster, sizeLimit is the required minimum size of a tentative cluster to qualify as a firm cluster (successful initiation), and local- Cluster is the initiated cluster, describing the established emergency region. Clearly, many other alternative algorithms can be constructed.

A second case is described for the situation of dropped calls. A first step is then to establish the even specific tag. In this case, the tag cannot be related to the event "dropped call", since then there will not be any position available. Rather, a tag related to poor radio quality is suitable, i.e. a Boolean isPoorRadioQuality is introduced. The initiation then proceeds by monitoring the isPoorRadioQuality quantity, for all connections in a specified region, e.g. a cell. High precision (A-GPS) reference positions are measured relatively often for each connection. Then when a first connection reaches a situation where isPoorRadioQuality becomes true, a tag is created according to Equation 7:

$$\text{Tag}_1 = (\text{isPoorRadioQuality}_1(t_1)\text{Tag}_{geographical}), \quad (7)$$

where $\text{Tag}_{geographical}$ is the part of the tag that may contain additional standard parts of the fingerprint consisting e.g. of cell IDs and quantized RTT measurements as described in [1]-[6]. Note that the Boolean isPoorRadioQuality is superfluous, it is included for clarity only.

Using the latest measured high precision position measurement of the connection a tentative cluster can then be initiated similarly as described with relation to the first case. Note that contrary to the first case, the cluster will be stationary in this case, this being the reason why additional parts may be introduced in the tag in Equation (7) to increase the resolution of the result. Note that if this is done, the distance check of the previously described algorithm needs to be augmented with a check that the tag is the same as for the first collected high precision measurement.

In order to be able to follow the evolution of an emergency region, the cluster defining said region needs to be updated. One of many ways to achieve this, as mentioned previously, is to specify a threshold for the age of points in the corresponding cluster, followed by the steps of Removal of high precision measurements that are older than the specified threshold. Note that this is possible since the time of each high precision measurement is saved in the cluster.

Recalculation of the polygon that describes said cluster, see [1]-[6] for details.

Figure 4:
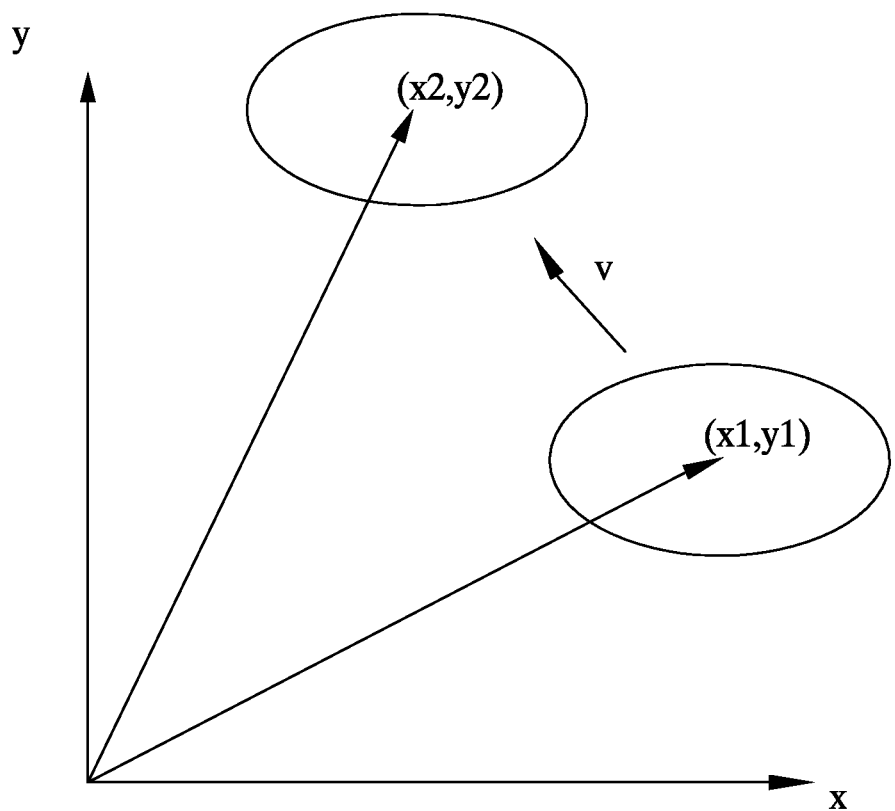
FIG. 4 illustrates a further example of the present invention.

The tracking of local event based clusters according to the present invention can be performed by means of the following schematic algorithm, also with reference to FIG. 4. The position of the local event cluster at two points in time (t1, t2) is indicated by the two ellipses, each with a respective calculated centre of gravity (x1, y1; x2, y2), and the speed of the cluster is indicated by the arrow v, where the position and velocity of the cluster is determined according to:

$$v_x(t+T) = v_x(t) + w_x(t)$$

$$v_y(t+T) = v_y(t) + w_y(t)$$

$$x(t+T) = x(t) + v_x(t) \cdot T + \overline{w}_x(t)$$

$$y(t+T) = y(t) + v_y(t) \cdot T + \overline{w}_y(t)$$

The calculation can be performed by means of a Kalman filter or similar. The determination of the centre of gravities and tracking of the event cluster can also be utilized in order to estimate a predicted movement pattern of the cluster. In that case the above calculated motion vectors are used to predict a next location of the cluster, and initiate detection of e.g. emergency call near the predicted location. This enables a rapid response to incoming emergency calls, and provides a valuable tool for coordinating actions from e.g. fire brigade or similar. A further possible application would be to utilized the determined movement to estimate a point of origin of the event, e.g. initial start of fire, release of gas etc.

It should be noted that since the generation of emergency regions or clusters are based solely on the fact that the high precision measurements are related to an emergency call, it is possible to locate the complete AECID algorithm in the emergency centers.

In summary, the present invention can be presented as

Tagging of high precision (A-GPS) measurements/positioning (lat/long points), with information related to specific events, for example The occurrence of emergency E-911 calls, at specific and close times.

Radio link quality drops below certain thresholds.

Detection algorithms for initiation of a new emergency call based clustering process, local in time and geographical location, said detection algorithms Providing means for storing and determining when a sufficient number of emergency calls have occurred close enough in time and space, to trigger the initiation of a new local clustering process (of high precision (A-GPS) measurements).

Providing means for determining when a new emergency call originates closely enough in time and distance, to be associated with the emergency cluster of high precision (A-GPS) measurements, If so, including said new high precision (A-GPS) measurement in said emergency cluster.

Maintenance algorithms for said emergency clusters, said algorithms enabling tracking of moving clusters.

Figure 5:
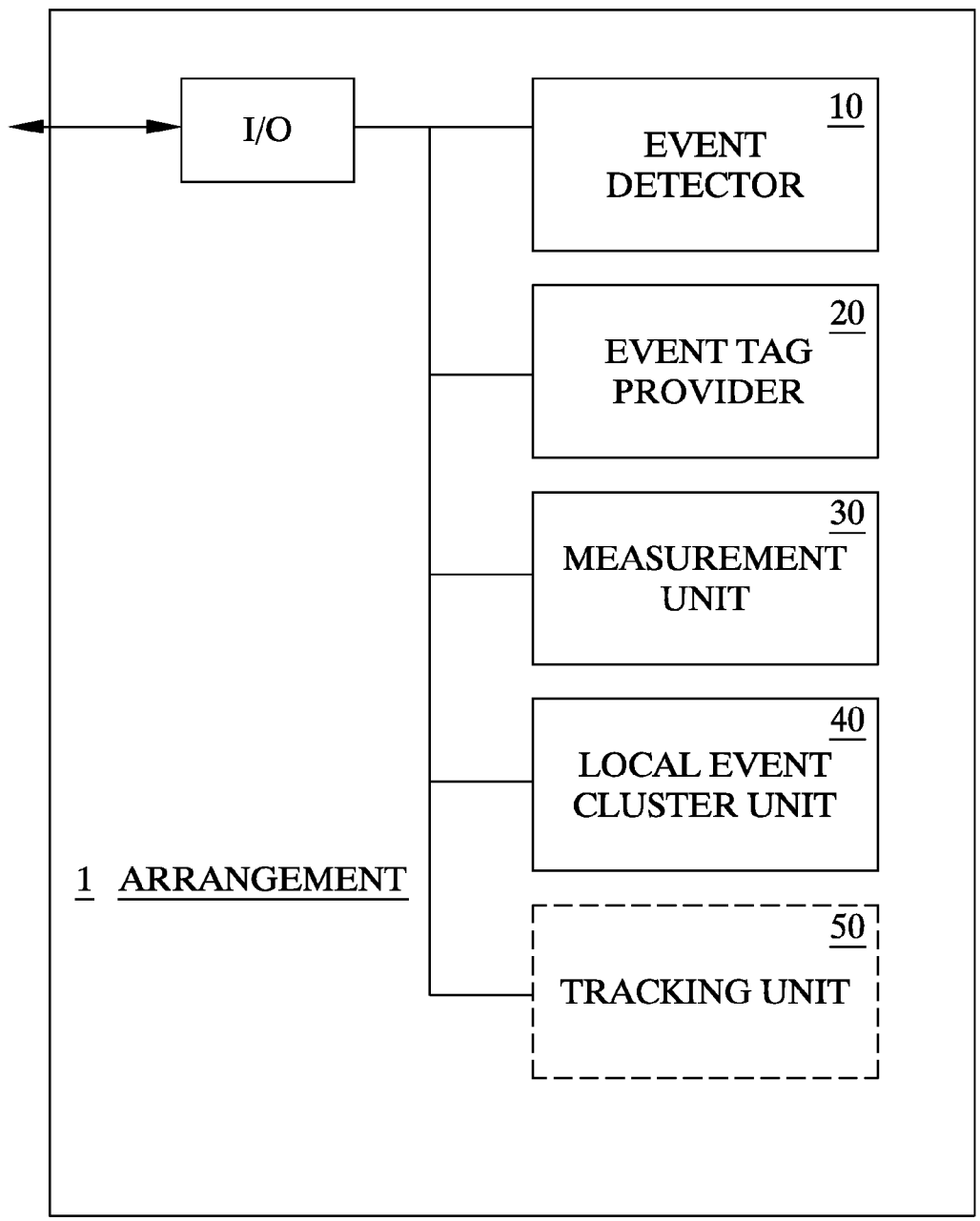
FIG. 5 illustrates an embodiment of an arrangement according to the present invention.

Fingerprinting positioning software for post-processing of emergency positioning, said software for post processing thus exploiting reported emergency position According to a basic embodiment with reference to FIG. 5, an arrangement 1 for improved clustering for includes the following entities, units, or functions. The arrangement 1 includes an event detector unit 10 for detecting events in a communication system. In addition, the arrangement comprises a tagging unit 20 providing a tag for each detected event. The tag comprises event specific information. Further, the arrangements includes a measurement unit for providing 30 high precision position measurements for each detected event. Finally, a clustering unit 40 for obtaining local clusters of high-precision position measurements based on said event tag.

According to a further embodiment, the arrangement comprises a tracking unit 50 for tracking the movement of the local event clusters.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] PCT/SE2005/001485, "Adaptive enhanced cell identity positioning", Oct. 7, 2005.
[2] PCT/SE2006/000132, "Path loss polygon positioning", Jan. 30, 2006.
[3] PCT/SE2006/050068 "Method and arrangement in a telecommunication system", Apr. 10, 2006.

[4] PCT/SE2006/050440, "Extended clustering for improved positioning", Oct. 30, 2006.
[5] PCT/SE2006/050535, "Method and arrangement for enhanced cell identification and cell positioning", Dec. 4, 2006.
[6] PCT/SE2007/050189, "Adaptive polygon computation and shape conversion for RTT positioning", Mar. 27, 2007.
[7] 3GPP, TS 23.032, "Universal Geographical Area Description (GAD).
[8] A. Kangas and T. Wigren, "Location coverage and sensitivity with A-GPS", URSI EMP-S, Pisa, Italy, May, 2004.

The invention claimed is:

1. A method of clustering position determination for providing position determination assisting data in a cellular communication network, comprising:
    detecting, by a radio network controller (RNC), an event;
    providing, by the RNC, a tag for the detected event, the tag comprising event-specific information and a time;
    providing, by the RNC, high-precision position measurements for the detected event;
    repeating, by the RNC, the detecting and providing steps a plurality of times;
    obtaining, by the RNC, a local event cluster of high-precision position measurements based on the tag; and
    tracking, by the RNC, a movement of the local event cluster by determining a geographical position by calculating a center of gravity of the local event cluster, generating, by the RNC, an updated local event cluster by removing a high-precision measurement from the local event cluster when an age of the high-precision measurement is greater than a predetermined threshold, and determining a geographical position of the updated local event cluster by recalculating the center of gravity.

2. The method of claim 1, wherein providing the tag comprises replacing an available tag with the tag comprising the event-specific information.

3. The method of claim 1, wherein providing the tag comprises adapting an available tag by at least adding the event-specific information.

4. The method of claim 1, wherein the tag is provided in response to a detected predetermined event.

5. The method of claim 4, wherein the predetermined event comprises an emergency call, and the tag comprises emergency call information.

6. The method of claim 4, wherein obtaining a local event cluster comprises initiating a tentative event cluster including the detected predetermined event, searching for identical events originating close to the tentative event cluster, and adding tags and high-precision position measurements associated with found identical events to the tentative event cluster.

7. The method of claim 6, comprising initiating a local event cluster including the tentative event cluster when a number of identical events of the tentative event cluster reaches a set threshold.

8. The method of claim 1, wherein the event comprises a dropped call; providing the tag comprises monitoring a predetermined radio quality parameter; and the tag is provided when the predetermined radio quality parameter reaches a predetermined minimum threshold.

9. The method of claim 8, wherein obtaining a local event cluster comprises initiating a tentative event cluster including the tag and corresponding high-precision measurement, and adding tagged events to the tentative event cluster as the tagged events are provided.

10. The method of claim 9, comprising initiating a local event cluster including the tentative event cluster when a number of tagged events of the tentative event cluster reaches a set threshold.

* * * * *